US011372448B2

(12) United States Patent
Cheng

(10) Patent No.: US 11,372,448 B2
(45) Date of Patent: Jun. 28, 2022

(54) WATERPROOF EXPANSION ELECTRONIC DEVICE WITH FUNCTIONAL MODULE

(71) Applicant: GETAC TECHNOLOGY CORPORATION, Hsinchu County (TW)

(72) Inventor: Yao-Kun Cheng, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 58 days.

(21) Appl. No.: 16/890,978

(22) Filed: Jun. 2, 2020

(65) Prior Publication Data

US 2021/0373600 A1    Dec. 2, 2021

(51) Int. Cl.
*G06F 1/16* (2006.01)
(52) U.S. Cl.
CPC .......... *G06F 1/1632* (2013.01); *G06F 1/1656* (2013.01); *G06F 1/1696* (2013.01)
(58) Field of Classification Search
CPC ...... G06F 1/1632; G06F 1/1656; G06F 1/186; G06F 1/1696
See application file for complete search history.

(56) References Cited

U.S. PATENT DOCUMENTS

| | | | | |
|---|---|---|---|---|
| 5,825,617 A | * | 10/1998 | Kochis | H04M 1/02 361/679.43 |
| 8,004,835 B2 | * | 8/2011 | Conti | G06F 1/1626 361/679.56 |
| 9,652,002 B2 | * | 5/2017 | Hamann | G06F 1/1626 |

* cited by examiner

*Primary Examiner* — James Wu

(57) ABSTRACT

Provided is an expansion electronic device suitable for being disposed at an edge of a main framework having therein a motherboard. The expansion electronic device includes an expansion frame bar and functional module. The expansion frame bar has thereon an expansion box. The expansion box has an access opening. The inner rim of the access opening has an inner annular wall. The access opening is covered with a protective cover. The outer rim of the protective cover has an outer annular wall corresponding in shape to the inner annular wall. A resilient annular surface is defined on the outer surface of the outer annular wall. The resilient annular surface abuts against the inner annular wall to hermetically seal the access opening. The functional module is disposed in the expansion box and electrically connected to a control wire exiting the functional module and electrically connected to the motherboard.

9 Claims, 6 Drawing Sheets

WATERPROOF EXPANSION ELECTRONIC DEVICE WITH FUNCTIONAL MODULE

BACKGROUND OF THE INVENTION

Field of the Invention

The present disclosure relates to expansion electronic devices disposed at edges of mobile electronic devices and, more particularly, to a waterproof expansion electronic device capable of switching between functions.

Description of the Prior Art

To maintain their structural strength and waterproofness, conventional rugged mobile electronic devices can hardly undergo any changes in partial appearance design. As a result, a change in partial appearance design of the conventional rugged mobile electronic devices entails designing the overall structure of a casing anew in order to meet requirements for structural strength and waterproofness. Consequently, it is difficult to mount expansion modules on the conventional rugged mobile electronic devices directly and still meet the requirements for structural strength and waterproofness. Therefore, the development and design process of the conventional rugged mobile electronic devices varies from purpose to purpose.

In view of the aforesaid drawback of the prior art, the inventor of the present disclosure conducted research in accordance with related theories with a view to overcoming the aforesaid drawback and improving the prior art.

SUMMARY OF THE INVENTION

The present disclosure provides a waterproof expansion electronic device capable of switching between functions.

The present disclosure provides an expansion electronic device suitable for being disposed at an edge of a main framework having therein a motherboard. The expansion electronic device comprises an expansion frame bar and a functional module. The expansion frame bar has thereon an expansion box. The expansion box has an access opening. The inner rim of the access opening has an inner annular wall. The access opening is covered with a protective cover. The outer rim of the protective cover has an outer annular wall. The outer annular wall corresponds in shape to the inner annular wall. A resilient annular surface is defined on the outer surface of the outer annular wall. The resilient annular surface abuts against the inner annular wall and thereby hermetically seals the access opening. The functional module is disposed in the expansion box and electrically connected to a control wire. The control wire exits the expansion box and is electrically connected to the motherboard.

The expansion box has therein a control circuit board. The control wire is connected to the control circuit board. The functional module is electrically connected to the control circuit board. The functional module is a fingerprint scanner, a barcode scanner, a magnetic stripe reader or a communication port.

The expansion box has an operation opening. The functional module comprises an operation interface. The operation interface is exposed from the operation opening. The expansion box has an operation opening. The functional module comprises a water barrier which surrounds the operation opening. A waterproof element is superimposed on the top of the water barrier. The waterproof element covers the top of the water barrier. The waterproof element has a first through hole. A press plate is superimposed on the waterproof element. The waterproof element has a second through hole. The first through hole corresponds in position to the second through hole. A cover plate is superimposed on the press plate to cover the second through hole. The operation interface comprises a magnetic head. The operation interface is connected to a connecting wire. The connecting wire penetrates the cover plate. A puncture formed on the cover plate because of the penetration thereof by the connecting wire is hermetically sealed with a gel. The expansion box has therein a control circuit board. The connecting wire is connected to the control circuit board.

The expansion box has therein an inner dam protruding. The inner annular wall is spaced apart from the inner dam. The outer annular wall is fitted between the inner annular wall and the inner dam. The functional module is disposed within the inner dam.

The expansion box disposed on the expansion frame bar is connected to the mobile electronic device; consequently, the functional modules disposed in the expansion box always selectively meet user needs. The aforesaid design entails changing the design of the expansion box without making enormous changes to the overall structure of the mobile electronic device; thus, the mobile electronic device of the present disclosure has wide applications. Therefore, the mobile electronic device of the present disclosure requires making a simple design change with a view to switching between functions, thereby reducing design change cost and development time.

DETAILED DESCRIPTION OF THE EMBODIMENTS

Figure 1:
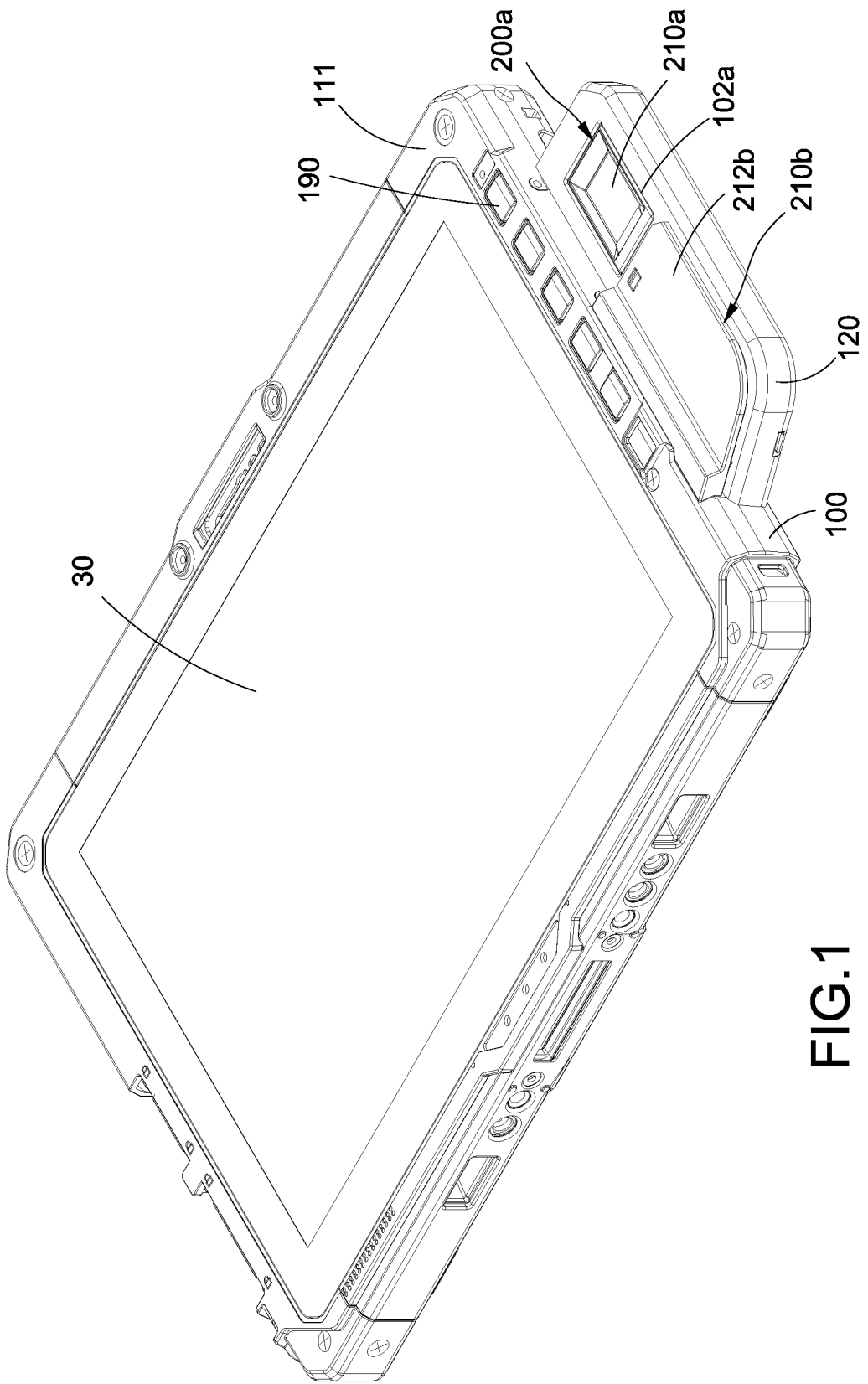
FIG. 1 is a perspective view of an expansion electronic device in state of use according to the first embodiment of the present disclosure.
Figure 2:
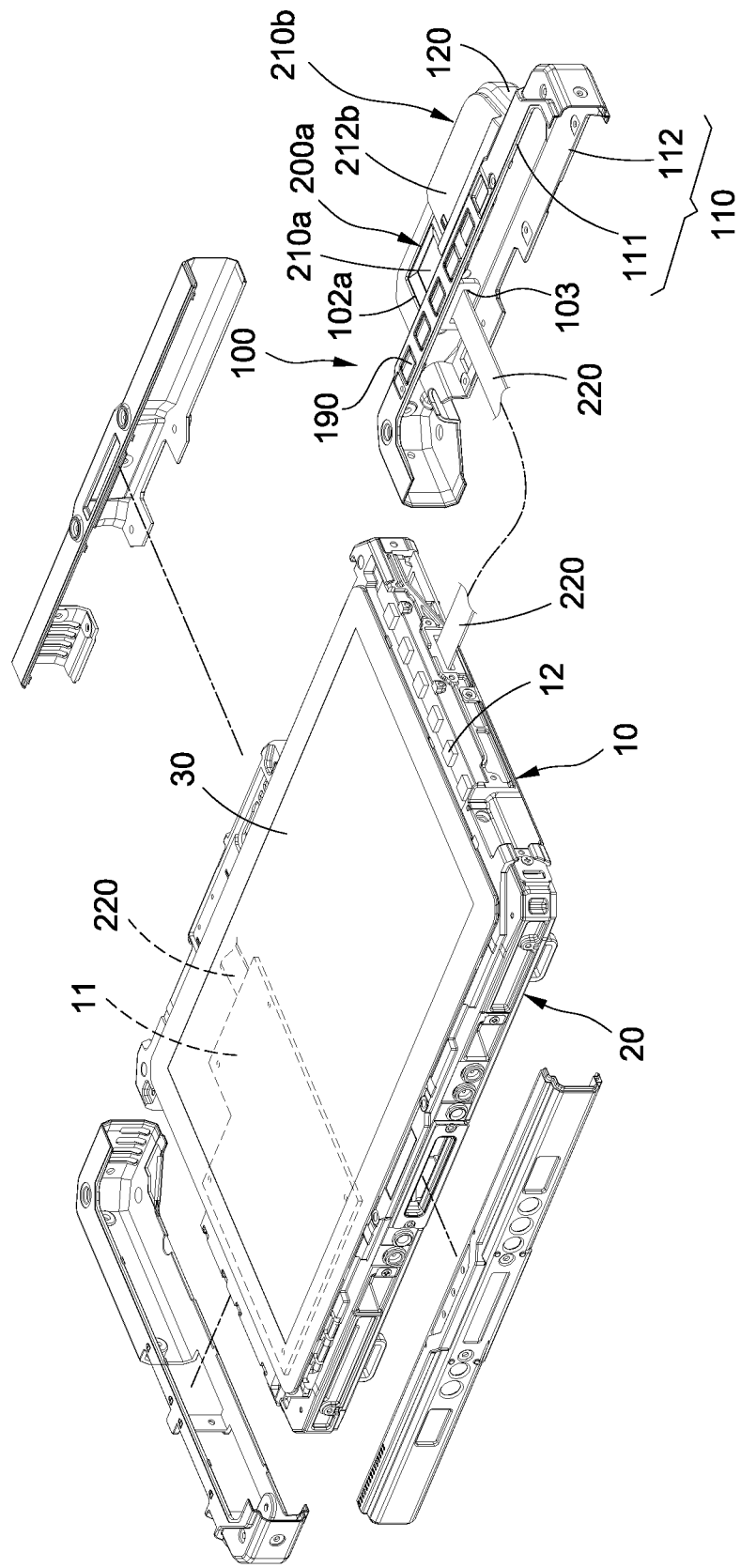
FIG. 2 is an exploded view of the expansion electronic device in state of use according to the first embodiment of the present disclosure.

Referring to FIG. 1 and FIG. 2, the first embodiment of the present disclosure provides an expansion electronic device suitable for being disposed at a mobile electronic device. The mobile electronic device at least comprises a main framework 10, a back cover 20 and a display panel 30. In general, the main framework 10 is substantially a cuboid. However, the main framework 10 can be a cuboid of any shape as needed. A motherboard 11 is superimposed on the main framework 10 and embedded in the main framework 10. The back cover 20 and the display panel 30 flank and cover the main framework 10. Preferably, the display panel 30 is adhered to the main framework 10, thereby dispensing with a cover. Therefore, the main framework 10 is clamped by the back cover 20 and the display panel 30 and fitted therebetween, and thus the two opposing sides of the main framework 10 are covered.

The expansion electronic device of the present disclosure is suitable for being disposed at the edge of the main framework 10. The expansion electronic device of the present disclosure comprises an expansion frame bar 100 and a functional module 200. The expansion frame bar 100 connects the functional module 200 to the mobile electronic device. The structural features of the expansion electronic device of the present disclosure and its relationship with the mobile electronic device are described below.

The expansion frame bar 100 is disposed at the edge of the main framework 10. Preferably, the expansion frame bar 100 is disposed on one of the two sides of the edge of the main framework 10, such that the expansion frame bar 100 is fastened and connected to the main framework 10. The expansion frame bar 100 is slender. One side of the expansion frame bar 100 extends outward to form a pair of flanges 110. The pair of flanges 110 are a front flange 111 and a rear flange 112. The rear flange 112 of the expansion frame bar 100 abuts against and fixes the back cover 20 to the main framework 10. The front flange 111 of the expansion frame bar 100 abuts against the main framework 10 and further abuts against the edge of the display panel 30 to thereby abut against and fix the display panel 30 to the main framework 10.

Figure 3:
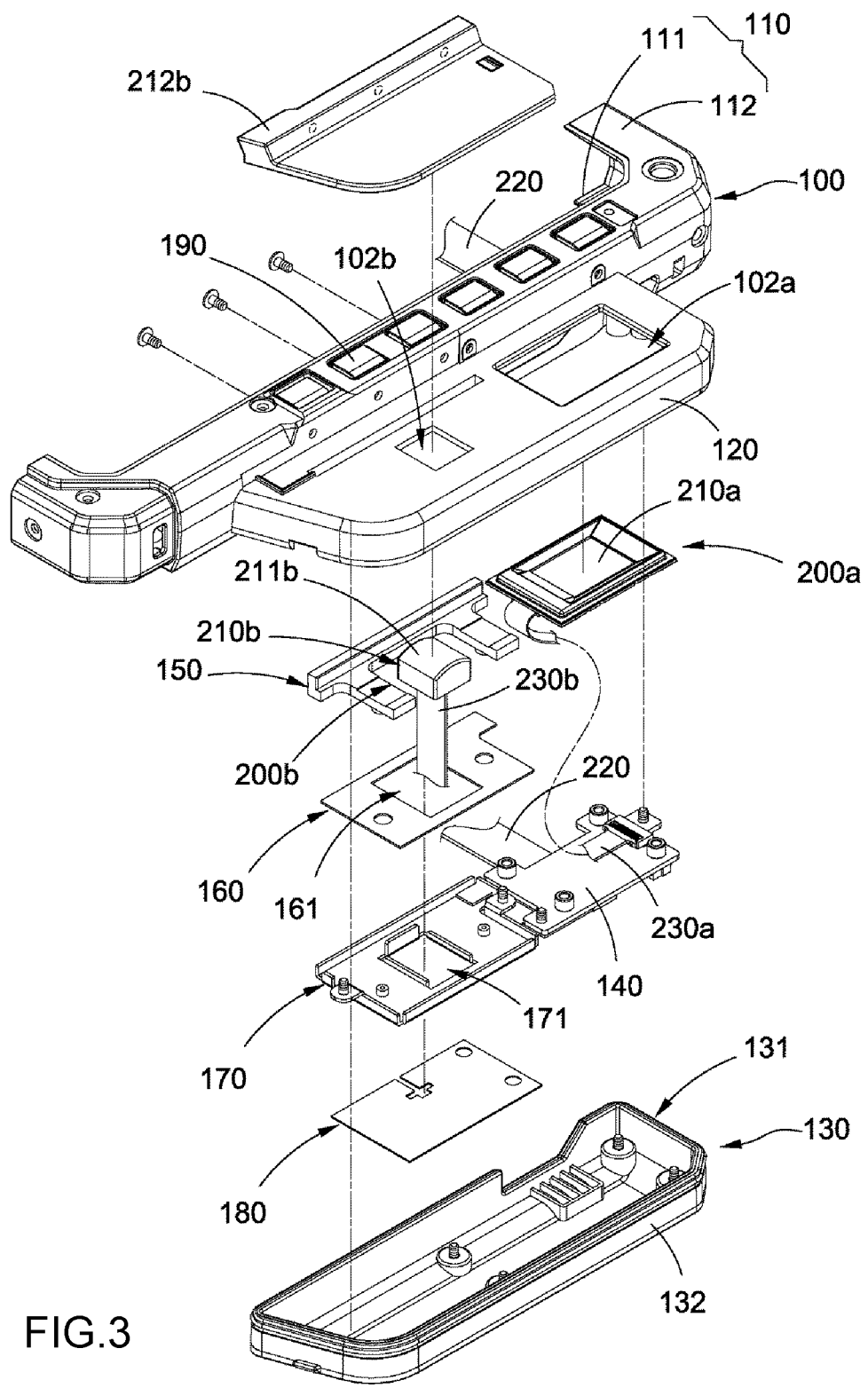
FIG. 3 is an exploded view of the expansion electronic device according to the first embodiment of the present disclosure.
Figure 4:
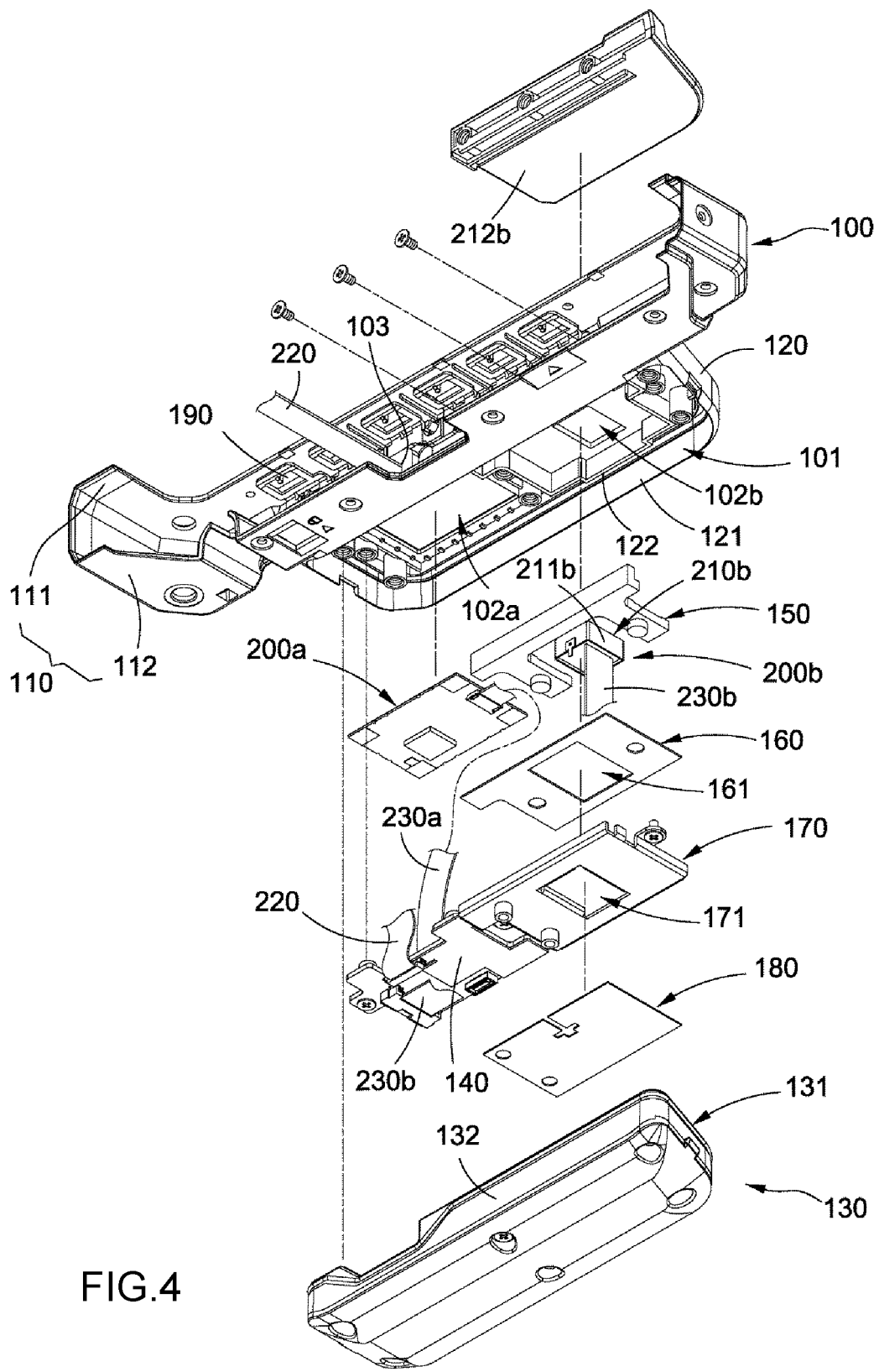
FIG. 4 is another exploded view of the expansion electronic device according to the first embodiment of the present disclosure.
Figure 5:
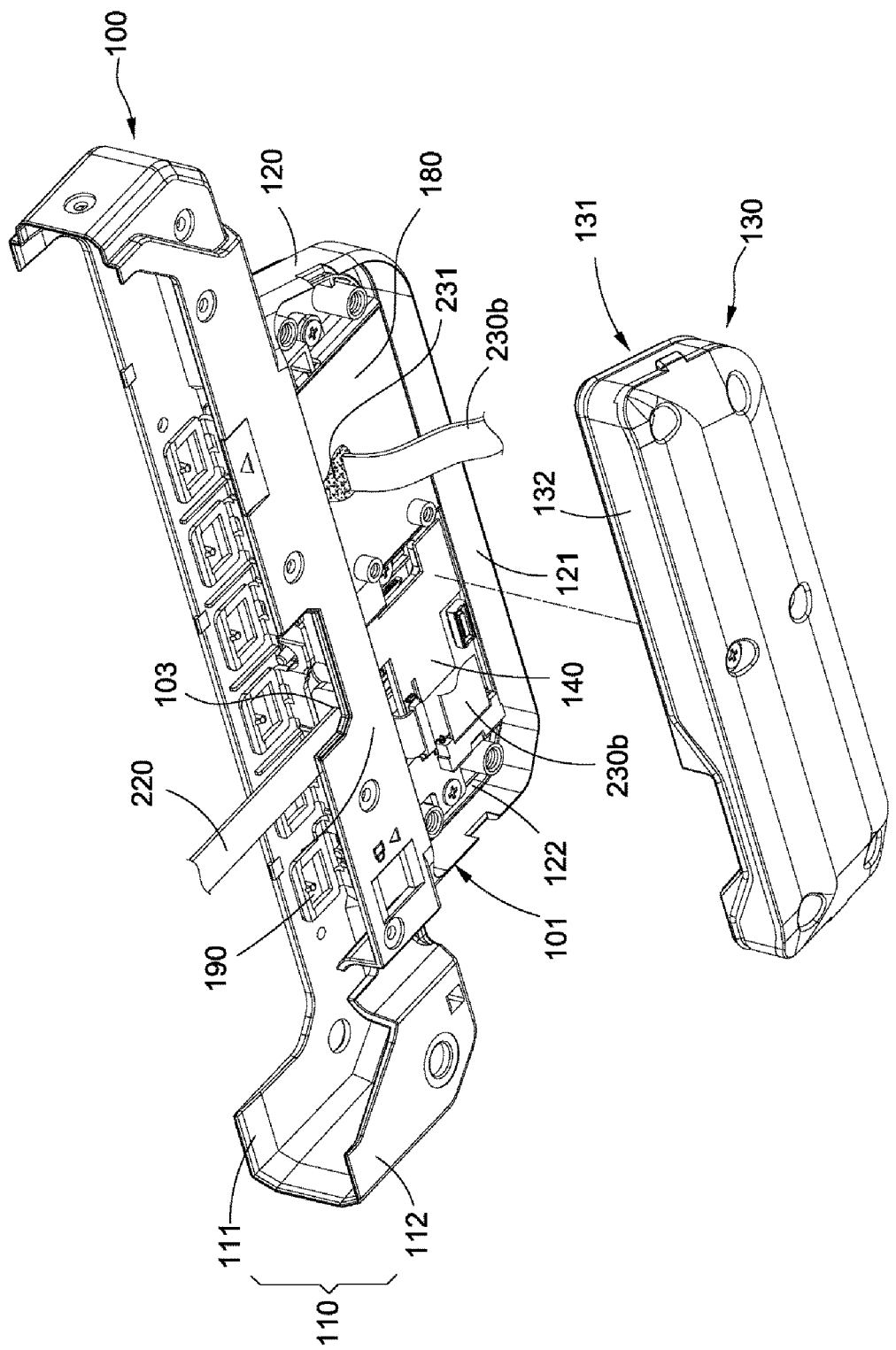
FIG. 5 is yet another exploded view of the expansion electronic device according to the first embodiment of the present disclosure.

Referring to FIG. 3 through FIG. 5, the expansion frame bar 100 extends to form an expansion box 120. Preferably, the expansion box 120 protrudes from the expansion frame bar 100 and faces away from the pair of flanges 110. The expansion box 120 has an access opening 101. The inner rim of the access opening 101 has an inner annular wall 121. The access opening 101 is covered with a protective cover 130. The outer rim of the protective cover 130 has an outer annular wall 131. The outer annular wall 131 corresponds in shape to the inner annular wall 121. A resilient annular surface 132 is defined on the outer surface of the outer annular wall 131. The resilient annular surface 132 abuts against the inner annular wall 121 and thereby hermetically seals the access opening 101.

The functional module 200 is disposed in the expansion box 120. The functional module 200 is inserted into the expansion box 120 and thus placed therein, through the access opening 101 of the expansion box 120. The functional module 200 is electrically connected to a control wire 220. The control wire 220 exits the expansion box 120 and is electrically connected to the motherboard 11. The expansion frame bar 100 has therein a wire connection opening 103 in communication with the expansion box 120, thereby allowing the control wire 220 to exit the expansion box 120 and electrically connect to the motherboard 11. The wire connection opening 103 is preferably located between the pair of flanges 110 of the expansion frame bar 100.

In this embodiment, the expansion box 120 has two functional modules 200 which differ from each other in functions so as for the expansion electronic device to have different additional functions. The expansion box 120 has therein a control circuit board 140. The functional modules 200 are electrically connected to the control circuit board 140, respectively. The control circuit board 140 is electrically connected to the motherboard 11 by a control wire 220 which exits the expansion box 120. Thanks to the control circuit board 140, the functional modules 200 are electrically connected to the motherboard 11.

In this embodiment, two functional modules 200$a$, 200$b$ in the expansion box 120 are a fingerprint scanner and a magnetic stripe reader, respectively, but the present disclosure is not limited thereto. In a variant embodiment, the two functional modules 200$a$, 200$b$ are barcode scanners. The expansion box 120 has operation openings 102$a$, 102$b$ corresponding in position to the functional modules 200$a$, 200$b$, respectively. The operation interface 210$a$ for the fingerprint scanner corresponds in position to the inner side of the operation opening 102$a$ and thus covers the operation opening 102$a$. Furthermore, the operation interface 210$a$ is connected to the control circuit board 140 by a connecting wire 230$a$. The expansion box 120 has therein a water barrier 150. The water barrier 150 corresponds in position to the inner wall of the expansion box 120 and thus surrounds the operation opening 102$b$ corresponding in position to the magnetic stripe reader. The operation interface 210$b$ for the magnetic stripe reader comprises a magnetic head 211$b$ exposed from the operation opening 102$b$ and a guide plate 212$b$ covering the magnetic head 211$b$. A gap is formed between the magnetic head 211$b$ and the guide plate 212$b$. A card is passed through the gap, thereby allowing the magnetic head 211$b$ to read from a magnetic stripe on the card. The magnetic head 211$b$ of the operation interface 210$b$ of the magnetic stripe reader is disposed within the water barrier 150. A waterproof element 160 is superimposed on the top of the water barrier 150 and thereby covers the top of the water barrier 150. The waterproof element 160 has a first through hole 161. A press plate 170 is superimposed on the waterproof element 160. The press plate 170 has a second through hole 171. The first through hole 161 corresponds in position to the second through hole 171. A cover plate 180 is superimposed on the press plate 170 to thereby cover the second through hole 171. The magnetic head 211$b$ is connected to a connecting wire 230$b$. The connecting wire 230$b$ extends to pass through the first through hole 161 and the second through hole 171 and penetrate the cover plate 180. A puncture formed on the cover plate 180 because of the penetration thereof by the connecting wire 230$b$ is hermetically sealed with a gel 231. The connecting wire 230$b$ is further connected to the control circuit board 140.

In addition, the expansion box 120 has therein an inner dam 122 protruding. The inner dam 122 is disposed within the inner annular wall 121. The inner annular wall 121 is spaced apart from the inner dam 122, such that the outer annular wall 131 is fitted between the inner annular wall 121 and the inner dam 122. The functional modules 200$a$, 200$b$ are disposed within the inner dam 122. Therefore, when the expansion box 120 is hit by an external force, the inner dam 122 prevents the outer annular wall 131 from undergoing inward deformation which might otherwise cause damage to the functional modules 200$a$, 200$b$.

A plurality of function keys 12 are disposed at an edge of the main framework 10. The function keys 12 are disposed on one of the surfaces of the main framework 10 or on an edge surface of the main framework 10. The expansion frame bar 100 encloses the function keys 12. A plurality of keycaps 190 corresponding in position to the function keys 12 respectively are disposed on the expansion frame bar 100. The keycaps 190 are exposed from the surface of the expansion frame bar 100 so as for the function keys 12 to be pressed by a user. Alternatively, the function keys 12 and the keycaps 190 are integrated and disposed in the expansion frame bar 100, with the keycaps 190 exposed from the surface of the expansion frame bar 100. In this embodiment, the keycaps 190 are preferably exposed from the front flange 111 of the expansion frame bar 100. Holes can be formed on the front flange 111 of the expansion frame bar 100, such that the keycaps 190 can be mounted in place. Alternatively, the keycaps 190 can be coupled to the expansion frame bar 100 by two-shot molding to facilitate assembly.

Figure 6:
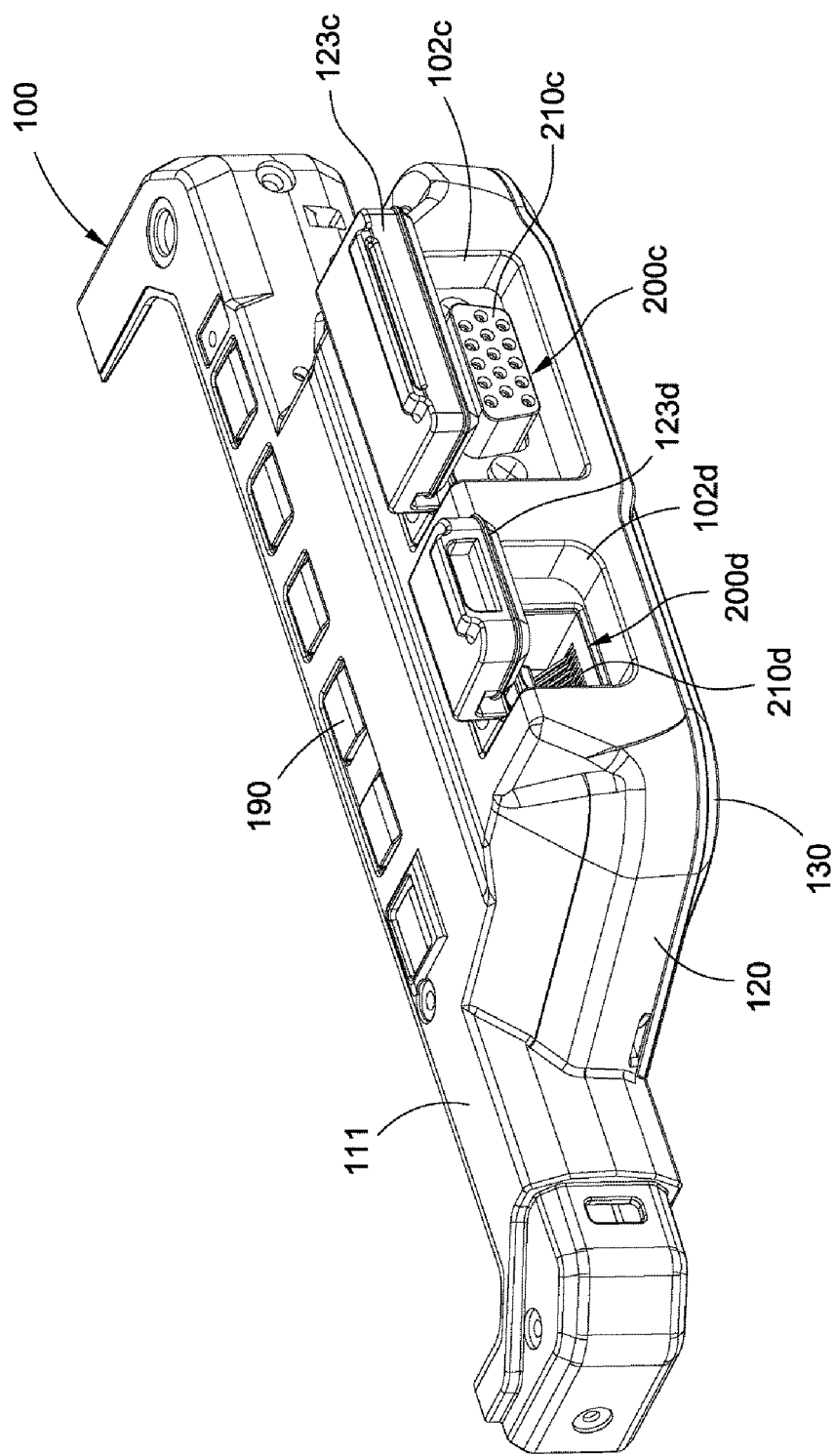
FIG. 6 is a perspective view of an expansion frame bar of the expansion electronic device in another aspect according to the second embodiment of the present disclosure.

Referring to FIG. 6, the second embodiment of the present disclosure provides an expansion electronic device which comprises an expansion frame bar 100 and a plurality of functional modules 200. The expansion frame bar 100 in the second embodiment has substantially the same structure as its counterpart in the first embodiment. The identical parts of the second embodiment and the first embodiment are omitted herein, whereas the differences between the second embodiment and the first embodiment are described below.

In this embodiment, two functional modules 200c, 200d in the expansion box 120 are a video port and a network port, respectively. The expansion box 120 has operation openings 102c, 102d corresponding in position to the functional modules 200c, 200d, respectively. An operation interface 210c for the video port is a VGA jack. An operation interface 210d for the network port is a RJ45 jack. The operation interfaces 210c, 210d are exposed from the operation openings 102c, 102d, respectively, and thus the operation openings 102c, 102d are hermetically sealed with waterproof covers 123c, 123d, respectively.

The expansion electronic device of the present disclosure is advantageous in that the expansion box 120 disposed on the expansion frame bar 100 is connected to the mobile electronic device; consequently, the functional modules 200a, 200b, 200c, 200d disposed in the expansion box 120 always selectively meet user needs. The aforesaid design entails changing the design of the expansion box 120 without making enormous changes to the overall structure of the mobile electronic device; thus, the mobile electronic device of the present disclosure has wide applications. Therefore, the mobile electronic device of the present disclosure requires making a simple design change with a view to switching between functions, thereby reducing design change cost and development time.

Although the present disclosure is disclosed above by preferred embodiments, the preferred embodiments are not restrictive of the present disclosure. Equivalent changes made by persons skilled in the art to the preferred embodiments without departing from the spirit of the present disclosure must be deemed falling within the scope of the present disclosure. Accordingly, the legal protection for the present disclosure should be defined by the appended claims.

What is claimed is:

1. An expansion electronic device, suitable for being disposed at an edge of a main framework having therein a motherboard, the expansion electronic device comprising:

an expansion frame bar having thereon an expansion box, the expansion box having an access opening covered with a protective cover, wherein an inner rim of the access opening has an inner annular wall, and an outer rim of the protective cover has an outer annular wall corresponding in shape to the inner annular wall, wherein a resilient annular surface is defined on an outer surface of the outer annular wall and abuts against the inner annular wall to thereby hermetically seal the access opening; and a functional module disposed in the expansion box and electrically connected to a control wire, the control wire exiting the expansion box and being electrically connected to the motherboard;

wherein the expansion box has an operation opening, and the functional module comprises a water barrier surrounding the operation opening, wherein a waterproof element with a first through hole is superimposed on a top of the water barrier and thus covers the top of the water barrier, wherein a press plate with a second through hole is superimposed on the waterproof element, and a cover plate is superimposed on the press plate to cover the second through hole.

2. The expansion electronic device of claim 1, wherein the expansion box has therein a control circuit board which the control wire is connected to, and the functional module is electrically connected to the control circuit board.

3. The expansion electronic device of claim 1, wherein the functional module is a fingerprint scanner, a barcode scanner, a magnetic stripe reader or a communication port.

4. The expansion electronic device of claim 1, and the functional module comprises an operation interface exposed from the operation opening.

5. The expansion electronic device of claim 4, wherein the operation interface comprises a magnetic head.

6. The expansion electronic device of claim 4, wherein the operation interface is connected to a connecting wire penetrating the cover plate, and a puncture formed on the cover plate because of the penetration thereof by the connecting wire is hermetically sealed with a gel.

7. The expansion electronic device of claim 6, wherein the expansion box has therein a control circuit board, and the connecting wire is connected to the control circuit board.

8. The expansion electronic device of claim 1, wherein the expansion box has an inner dam protruding and spaced apart from the inner annular wall, such that the outer annular wall is fitted between the inner annular wall and the inner dam.

9. The expansion electronic device of claim 8, wherein the functional module is disposed within the inner dam.

* * * * *